(12) United States Patent
Zhang

(10) Patent No.: US 11,697,315 B2
(45) Date of Patent: Jul. 11, 2023

(54) GOLF CART FRONT SUSPENSION LIFT KIT

(71) Applicant: Yujie Zhang, Greenville, SC (US)

(72) Inventor: Yujie Zhang, Greenville, SC (US)

( * ) Notice: Subject to any disclaimer, the term of this patent is extended or adjusted under 35 U.S.C. 154(b) by 0 days.

(21) Appl. No.: 17/528,627

(22) Filed: Nov. 17, 2021

(65) Prior Publication Data

US 2023/0150325 A1    May 18, 2023

(51) Int. Cl.
*B60G 7/00* (2006.01)
*B60G 7/02* (2006.01)
*B60G 11/02* (2006.01)

(52) U.S. Cl.
CPC .......... *B60G 7/001* (2013.01); *B60G 7/02* (2013.01); *B60G 11/02* (2013.01); *B60G 2202/11* (2013.01); *B60G 2204/121* (2013.01); *B60G 2204/143* (2013.01); *B60G 2204/418* (2013.01); *B60G 2300/26* (2013.01); *B60G 2500/30* (2013.01)

(58) Field of Classification Search
CPC .......... B60G 7/001; B60G 7/02; B60G 11/02; B60G 2202/11; B60G 2204/121; B60G 2204/143; B60G 2204/418; B60G 2300/26; B60G 2500/30
See application file for complete search history.

(56) References Cited

U.S. PATENT DOCUMENTS

| | | | | |
|---|---|---|---|---|
| 3,823,540 A | * | 7/1974 | Mandl | D01H 7/2225 57/88 |
| 5,967,536 A | * | 10/1999 | Spivey | B60G 17/021 280/124.141 |
| 6,116,626 A | * | 9/2000 | Cherry | B62D 7/18 244/50 |
| 2009/0278329 A1 | * | 11/2009 | VanDenberg | B60G 11/225 280/124.13 |
| 2018/0354332 A1 | * | 12/2018 | Zhang | B60G 7/008 |
| 2019/0225041 A1 | * | 7/2019 | Upah | B62D 21/183 |
| 2021/0046794 A1 | * | 2/2021 | Zhang | B60G 15/02 |
| 2021/0402839 A1 | * | 12/2021 | West | B60G 11/08 |

* cited by examiner

*Primary Examiner* — Drew J Brown
(74) *Attorney, Agent, or Firm* — Dority & Manning, P.A.

(57) ABSTRACT

A front suspension lift kit for a golf cart includes first and second beams mountable to a frame of the golf cart. A first strut is mountable to the frame of the golf cart and a distal end portion of the first beam such that the first strut extends between the frame of the golf cart and the first beam. A second strut is mountable to the frame of the golf cart and a distal portion of the second beam such that the second strut extends between the frame of the golf cart and the second beam. A support bracket is mountable to the first and second beams at the distal end portions of the first and second beams. The lift kit also includes a swing arm, a spindle bracket, and a coil-over shock.

20 Claims, 5 Drawing Sheets

GOLF CART FRONT SUSPENSION LIFT KIT

FIELD OF THE INVENTION

The present subject matter relates generally to lift kits for golf cart front suspensions.

BACKGROUND OF THE INVENTION

A golf cart generally includes a front suspension that connects the golf cart's frame and front wheels. The front suspension allows relative motion between the frame and front wheels. Thus, the front suspension contributes to the handling and ride quality of the golf cart.

A ride height of the front suspension is generally factory selected, and golf cart manufacturers frequently tune the front suspension for road or golf course conditions. Thus, the factory ride height of many golf carts is lower than preferred by some golf carts users. To increase the golf cart's ride height, a lift kit may be added to supplement or replace the factory front suspension.

Known lift kits have certain drawbacks. For example, certain lift kits require modifying the golf cart's frame. In particular, such lift kits can require drilling, welding or cutting the golf cart's frame, and such modifications can be labor intensive and/or require tools not available to all golf carts users.

BRIEF DESCRIPTION OF THE INVENTION

Aspects and advantages of the invention will be set forth in part in the following description, or may be apparent from the description, or may be learned through practice of the invention.

In an example embodiment, a front suspension lift kit for a golf cart includes a support body mountable to a frame of the golf cart. A leaf spring is mounted to the support body, and a lower swing arm is rotatably mounted to the support body. A distal end portion of the lower swing arm is coupled to a distal end portion of the leaf spring. An upper swing arm is rotatably mountable to the frame of the golf cart. A distal end portion of the upper swing arm is mountable to a shock of the golf cart. A spindle is mountable to the lower and upper swing arms at the distal end portions of the lower and upper swing arms such that the spindle is rotatable on the lower and upper swing arms. The spindle includes a mounting plate fixed on an axle of the spindle. A brake drum of the golf cart is mountable to the spindle at the mounting plate.

In another exemplary embodiment, a front suspension lift kit for a golf cart includes a support body mountable to a frame of the golf cart. A leaf spring mounted to the support body, and a lower swing arm is rotatably mounted to the support body. A distal end portion of the lower swing arm is coupled to a distal end portion of the leaf spring. An upper swing arm is rotatably mountable to the frame of the golf cart. A distal end portion of the upper swing arm is mountable to a shock of the golf cart. A spindle is mountable to the lower and upper swing arms at the distal end portions of the lower and upper swing arms such that the spindle is rotatable on the lower and upper swing arms. The spindle includes a mounting plate welded to an axle of the spindle. A brake drum of the golf cart is mountable to the spindle at the mounting plate. The spindle further includes a hanger extending from the mounting plate of the spindle. The hanger defines a brake cable opening. A brake cable of the golf cart is mountable to the spindle at the brake cable opening of the hanger.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
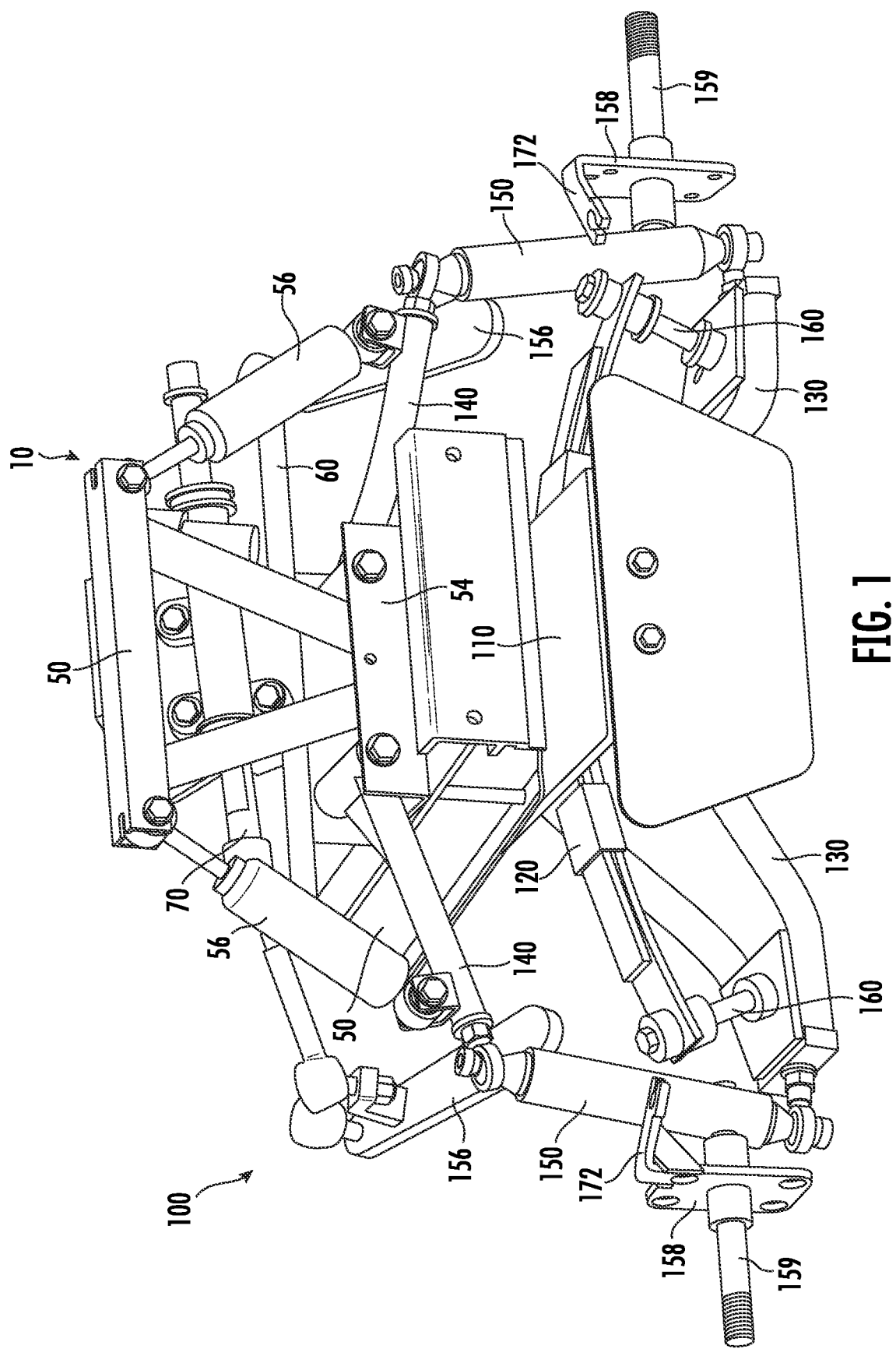
FIG. 1 is a perspective view of a front suspension lift kit for a golf cart according to an example embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. For example, the approximating language may refer to being within a ten percent (10%) margin.

As may be seen in FIGS. 1 through 8, the present subject matter is directed to golf cart front suspension lifts. It will be understood that the golf cart front suspension lift kits described herein may be used in or with any suitable golf cart. As an example, the front suspension lift kits described herein may be used in or with a Club Car® Carryall® golf cart. Thus, the front suspension lift kits is described in greater detail below in the context of and are illustrated as suitable for use in Club Car® Carryall® golf carts. However, the present subject matter is not limited to any particular golf car model, style or arrangement.

Figure 2:
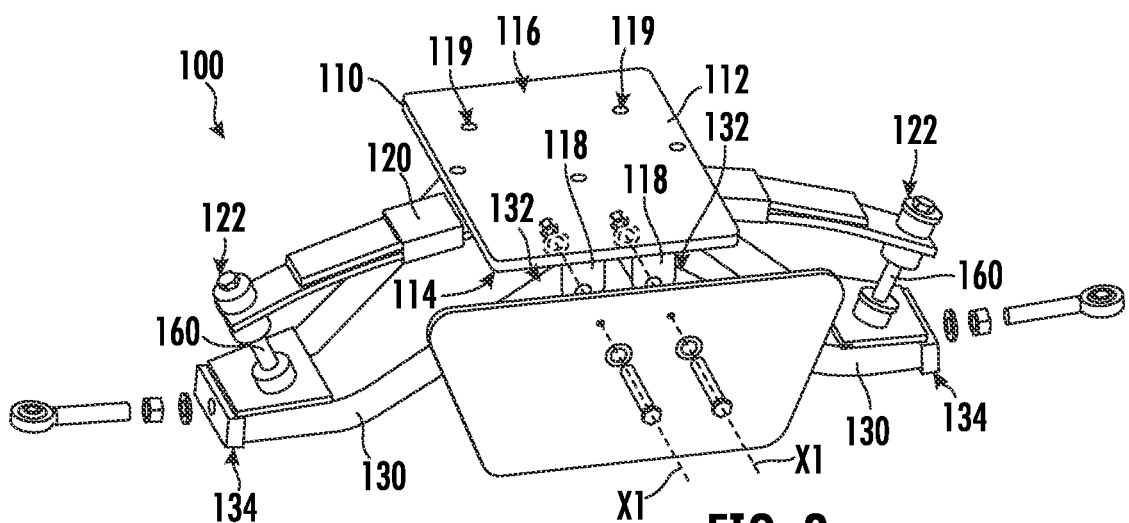
FIGS. 2 through 8 are perspective views of certain components of the example front suspension lift kit of FIG. 1 being mounted to a frame of the golf cart.

FIG. 1 is a perspective view of a front suspension lift kit 100 for a golf cart 10 according to an example embodiment of the present subject matter. FIG. 2 is a front, elevation view of front suspension lift kit 100. Components of golf cart 10 may be factory or stock components that front suspension lift kit 100 cooperates with to adjust a ride height of golf cart 10. As may be seen in FIGS. 1 and 2, golf cart 10 includes a frame 50. Thus, frame 50 may be a factory or stock component of golf cart 10 and is not a component of front suspension lift kit 100. In addition, one or more of a front wheel 20, a bracket 54, front shocks 56, a tie rod 60, a rack-and-pinion 70, a wheel bearing 80, a brake drum 90, and a brake cable 92 may be factory or stock components that front suspension lift kit 100 cooperates with to adjust a ride height of golf cart 10. However, it will be understood that one or more of front wheel 20, bracket 54, front shocks 56, tie rod 60, rack-and-pinion 70, wheel bearing 80, brake drum 90, brake cable 92, and other components of golf cart 10 may be replaced, e.g., with a performance part. However, such components may not form part of front suspension lift kit 100 in certain example embodiments. As discussed in greater detail below, front suspension lift kit 100 may be mounted to or on the existing components of golf cart 10, including frame 50, to adjust the ride height of golf cart 10.

Figure 3:
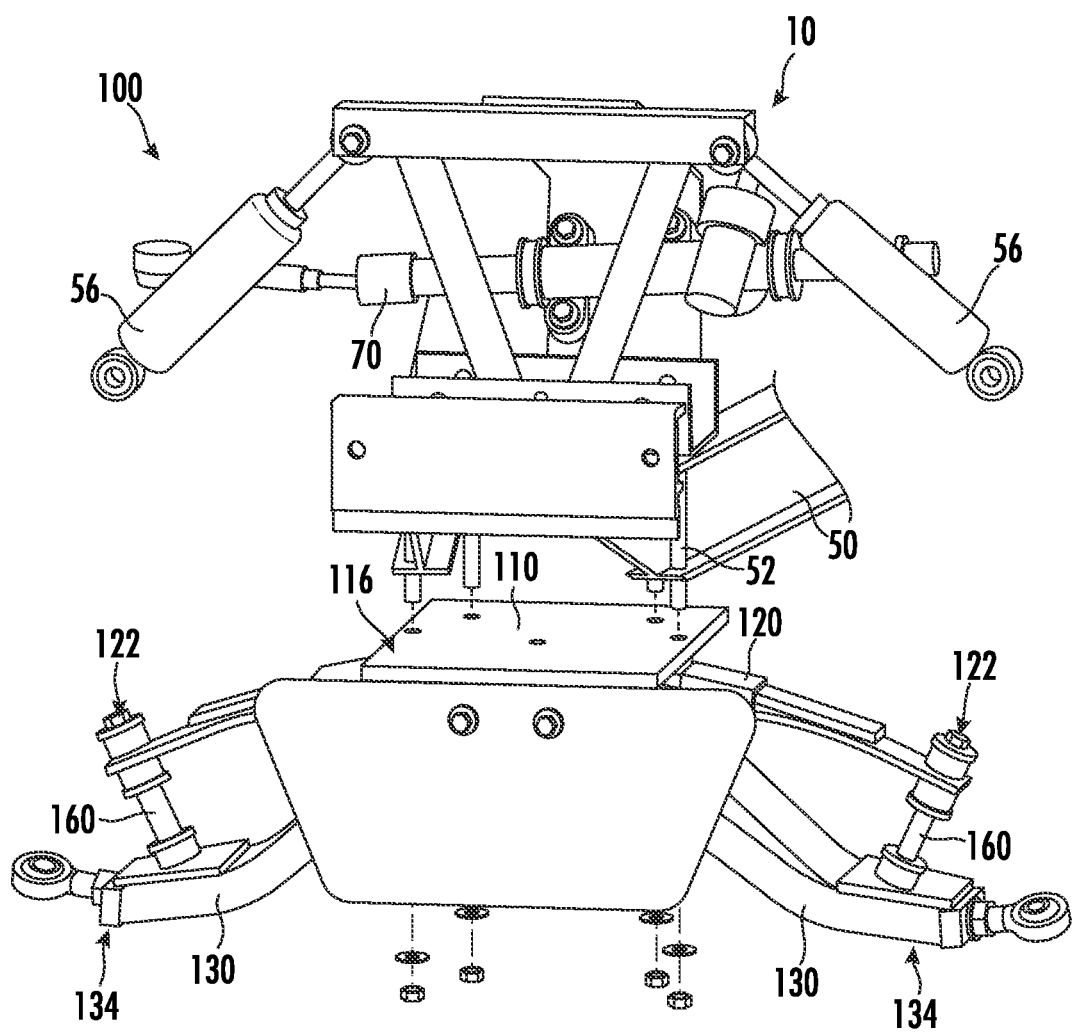
Figure 4:
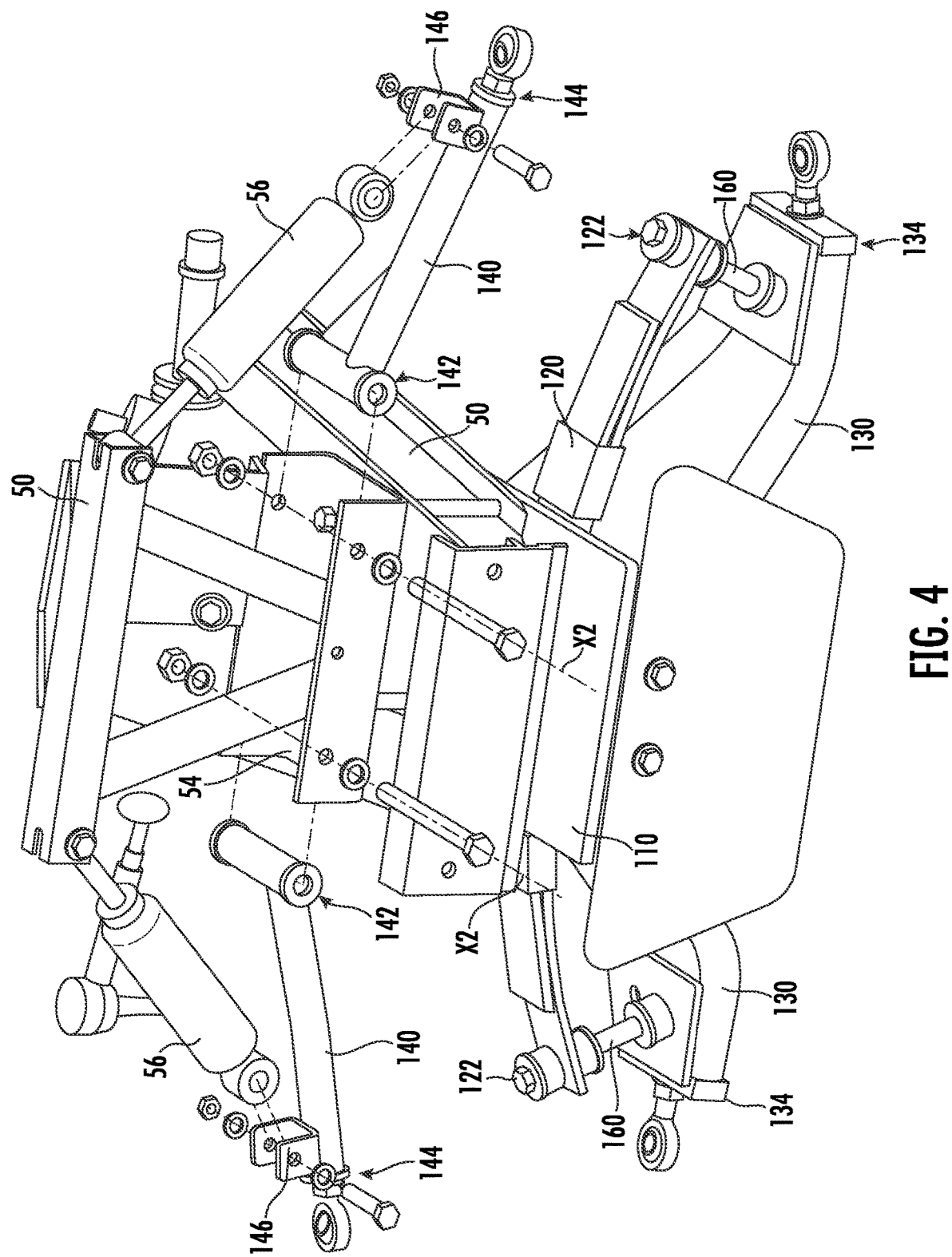

As may be seen in FIG. 1, front suspension lift kit 100 includes a support body 110, a leaf spring 120, a pair of lower swing arms 130, a pair of upper swing arms 140, and a pair of spindles 150. Lower swing arms 130 and upper swing arms 140 may also be referred to as A-arms herein. Support body 110 and upper swing arms 140 are mountable to golf cart 10, e.g., frame 50 of golf cart 10, and may collectively form a support assembly for mounting additional components of front suspension lift kit 100 to golf cart 10. FIGS. 3 and 4 show support body 110 and upper swing arms 140 being mounted to frame 50 of golf cart 10. Mounting of support body 110 to frame 50 of golf cart 10 is described in greater detail below in the context of FIG. 3, and mounting of upper swing arms 140 to frame 50 of golf cart 10 is described in greater detail below in the context of FIG. 4.

As shown in FIG. 2, leaf spring 120 and lower swing arms 130 may be mounted to support body 110. For example, support body 110 may include a top or support plate 112, and leaf spring 120 and lower swing arms 130 may be mounted to top plate 112 at lower surface 114 of top plate 112. Moreover, leaf spring 120 may be mounted top plate 112 at a middle portion of leaf spring 120. Thus, e.g., distal end portions 122 of leaf spring 120 may be cantilever and spaced from support body 110. Lower swing arms 130 may be rotatably mounted to support body 110. Moreover, lower swing arms 130 may be rotatable about a rotational axis X1 relative to support body 110. As an example, proximal end portions 132 of lower swing arms 130 may be rotatable mounted to top plate 112 at brackets 118 on lower surface 114 of top plate 112. An upper surface 116 of top plate 112 may be positioned opposite lower surface 114 of top plate 112 on top plate 112.

Distal end portions 134 of lower swing arms 130 may move relative to proximal end portions 132 of lower swing arms 130 mounted to support body 110. For instance, as discussed in greater detail below, support body 110 may be mounted to frame 50 of golf cart 10. During driving of golf cart 10, lower swing arms 130 may rotate relative to support body 110 in order to provide suitable ride quality for golf cart 10. As shown in FIG. 2, front suspension lift kit 100 may also include a pair of struts 160. Struts 160 may extend between leaf spring 120 and lower swing arms 130. Moreover, struts 160 may extend between and connect distal end portions 134 of lower swing arm 130 and distal end portions 122 of leaf springs 120. Struts 160 may thus couple leaf spring 120 and lower swing arms 130, e.g., such that leaf spring 120 suspends and supports lower swing arms 130 when front suspension lift kit 100 is mounted on golf cart 10. Leaf spring 120 may also be positioned between lower and upper swing arms 130, 140 when front suspension lift kit 100 is mounted on golf cart 10.

Installation of support body 110 and upper swing arms 140 to frame 50 of golf cart 10 will now be described with reference to FIGS. 3 and 4. As shown in FIG. 3, support body 110 may be positioned on a bottom of frame 50. For example, upper surface 116 of top plate 112 may be positioned on the bottom of frame 50, e.g., at a location where a stock or factory leaf spring is mounted to frame 50. Bolts 52 used to mount the stock or factory leaf spring to frame 50 may extend through and fasten top plate 112 to frame 50, e.g., when golf cart 10 is a Club Car® Carryall® golf cart, at holes 119 (FIG. 2) through top plate 112. Thus, frame 50 need not be drilled or otherwise modified to mount support body 110 to frame 50.

Turning to FIG. 4, upper swing arms 140 may be rotatably mounted to frame 50 of golf cart 10, e.g., to a bracket 54 of golf cart 10. Bracket 54 of golf cart 10 may correspond to a location on frame 50 at which stock or factory swing arms are mounted, e.g., when golf cart 10 is a Club Car® Carryall® golf cart. Proximal end portions 142 of upper swing arms 140 may be rotatable mounted to bracket 54. Moreover, in certain example embodiments, proximal end portions 142 of upper swing arms 140 may be received between laterally spaced walls of bracket 54. In certain example embodiments, upper swing arms 140 may be rotatable about a rotational axis X2 relative to frame 50. The rotational axes X2 of upper swing arms 140 may be, e.g., about, parallel to the rotation axes X1 (FIG. 2) of lower swing arms 130.

Distal end portions 144 of upper swing arms 140 may move relative to proximal end portions 142 of upper swing arms 140 mounted to frame 50. For instance, during driving of golf cart 10, upper swing arms 140 may rotate relative to frame 50 in order to provide suitable ride quality for golf cart 10. As shown in FIG. 3, golf cart 10 may include front shocks 56. Front shocks 56 may be mounted to upper swing arms 140. For instance, front shocks 56 may be mounted to mounting brackets 146 of upper swing arms 140 positioned at distal end portions 144 of upper swing arms 140. Front shocks 56 may extend between frame 50 of golf cart 10 and upper swing arms 140. Front shocks 56 may thus couple upper swing arms 140 to frame 50, e.g., such that front shocks 56 suspend and support upper swing arms 140 when front suspension lift kit 100 is mounted on golf cart 10.

Figure 5:
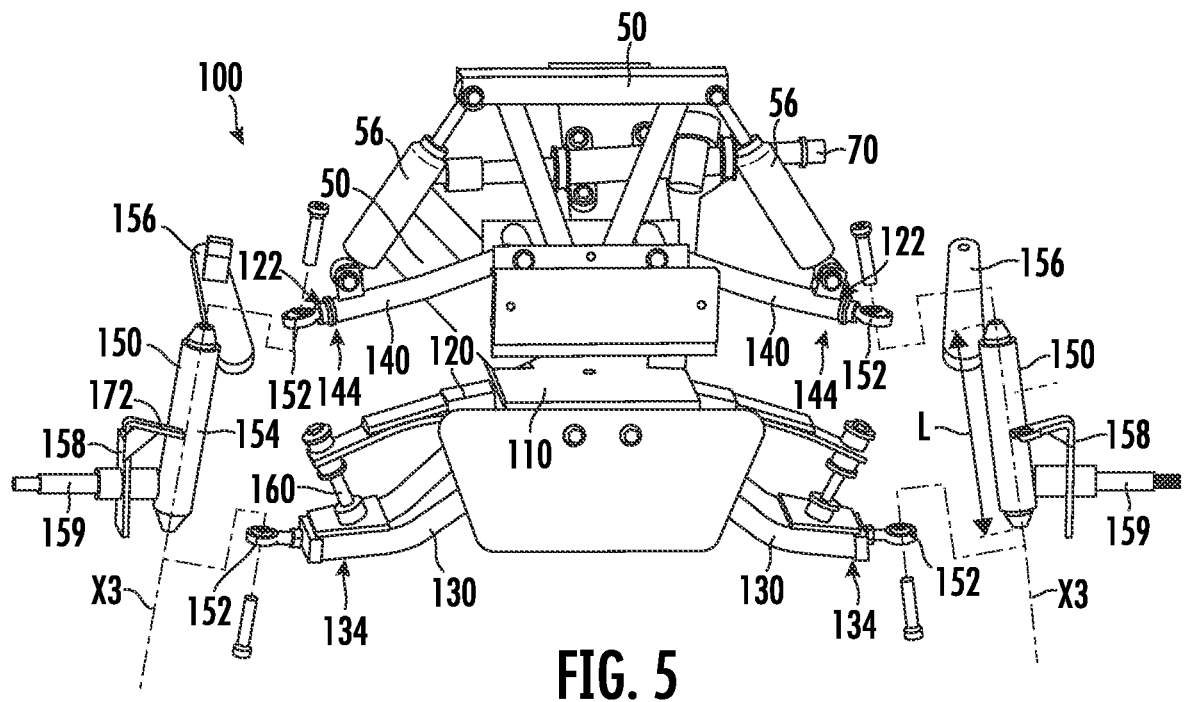

As may be seen in FIG. 5, front suspension lift kit 100 may also include spindle bearings 152. Each spindle bearing 152 may be mounted at a respective distal end portion 134, 144 of lower and upper swing arms 130, 140. Spindles 150 are receivable between a respective pair of spindle bearings 152 on lower and upper swing arms 130, 140. In particular, spindles 150 may be mounted to lower and upper swing arms 130, 140 with spindle bearings 152 such that spindles 150 are rotatable on spindle bearings 152 relative to lower and upper swing arms 130, 140. In particular, spindles 150 may be rotatable on spindle bearings 152 about a rotational axis X3 of spindles 150, e.g., relative to lower and upper swing arms 130, 140. In certain example embodiments, the rotational axes X3 of spindles 150 may be, e.g., about, parallel to the rotation axes X1 of lower swing arms 130 and/or the rotation axes X2 of upper swing arms 140. Lower and upper swing arms 130, 140 may support spindles 150. In particular, spindles 150 may translate vertically with lower and upper swing arms 130, 140, e.g., when distal end portions 134 of lower swing arms 130 and distal end portions 144 of upper swing arms 140 translate vertically during pivoting of lower and upper swing arms 130, 140. Spindles 150 may also rotate relative to lower and upper swing arms 130, 140 in order to allow turning of the wheels of golf cart 10 mounted to spindles 150.

Spindles 150 may define a length L, e.g., between top and bottom portions of spindle 150. The length L of spindle 150 may be no less than six inches (6") and no greater than eighteen inches (18"). Such length L of spindles 150 may assist with providing an increased ride height relative to the stock ride height of golf cart 10 while also allowing installation of both lower and upper swing arms 130, 140 in rder Spindles 150 may include a cylinder 154 and a steering arm 156. Steering arm 156 may extend outwardly from cylinder 154 of each spindle 150. Steering arms 156 of spindle 150 may be configured for connecting to a tie rod 60 of golf cart 10, as shown in FIG. 1. Thus, e.g., steering arms 156 may be bolted to tie rod 60. Both spindles 150 may be coupled together with tie rod 60, e.g., such that spindles 150 rotate together. One or both of spindles 150 may also be coupled to a rack-and-pinion 70 of golf cart 10. For example, the steering arm 156 of one of spindles 150 may provide a connection point for rack-and-pinion 70 of golf cart 10. Thus, rack-and-pinion 70 may be coupled to such steering arm 156, e.g., such that rack-and-pinion 70 rotates spindles 150 when a driver of golf cart 10 turns a steering wheel (not shown) of golf cart 10. Thus, e.g., steering arms 156 may accommodate the increased ride height provided by front suspension lift kit 100 relative to the stock ride height of golf cart 10 and allow the existing steering system of golf cart 10 to connect to front suspension lift kit 100.

Each spindle 150 also includes a mounting plate 158 mounted and an axle 159. Axle 159 may extend outwardly from cylinder 154 of each spindle 150. Axle 159 may be positioned below steering arm 156 on cylinder 154, e.g., when spindles 150 are mounted on lower and upper swing arms 130, 140. In particular, axle 159 may be positioned at or adjacent a bottom portion of spindle 150, and steering arm 156 may be positioned at or adjacent a top portion of spindle 150. A wheel bearing 80 (FIG. 6) of golf cart 10 may be mounted on each axle 159, and a front wheel 20 (FIG. 9) of golf cart 10 may be mounted on each wheel bearing 80. Thus, front wheels 20 may be mounted to spindles 150 on axles 159 via wheel bearings 80 on axles 159. Axle 159 may extend outwardly from cylinder 154 along an axis of rotation for front wheel 20. The axis of rotation of front wheel 20 on axle 159 may be oriented about perpendicular to the rotation axes X1 of lower swing arms 130 and/or the rotation axes X2 of upper swing arms 140.

Figure 6:
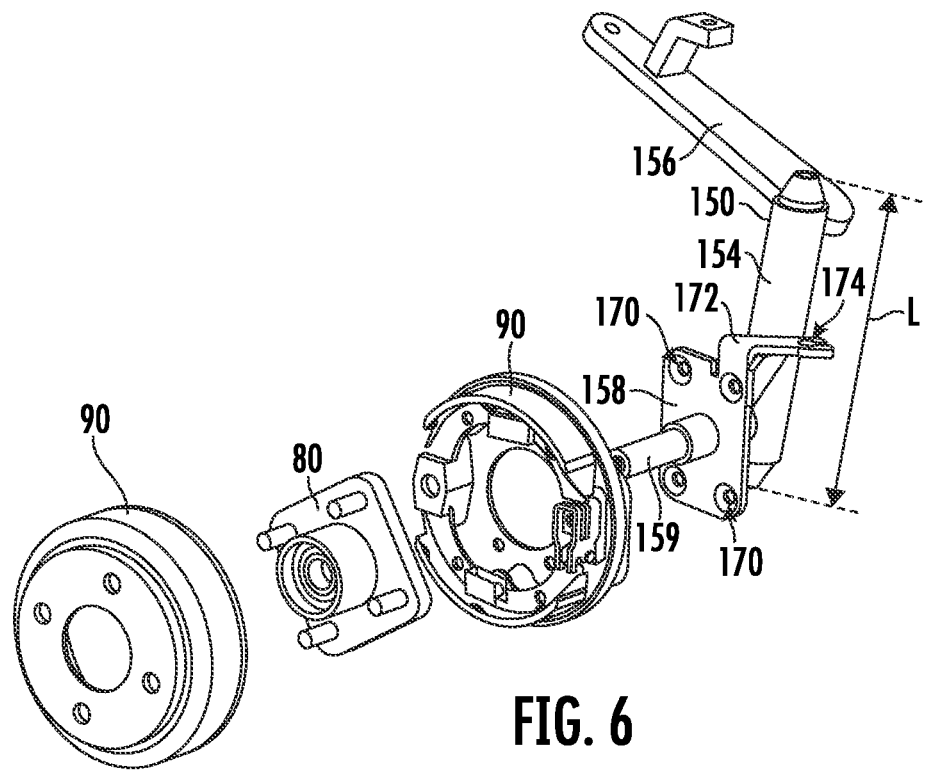

As noted above, each mounting plate 158 is mounted on axle 159 of a respective spindle 150. Thus, mounting plate 158 may be fixed relative to axle 159 such that front wheel 20 on axle 159 rotates relative to both axle 159 and mounting plate 158 during driving of golf cart 10. As an example, mounting plate 158 may be welded to axle 159. As shown in FIG. 6, a brake drum 90 of golf cart 10 is mountable to spindle 150 at mounting plate 158. For instance, mounting plate 158 may define a plurality of mounting holes 170, a plurality of fasteners, such as bolts, may extend through brake drum 90 and mounting plate 158 to mount brake drum 90 to spindle 150. As may be seen from the above, front suspension lift kit 100 may provide a double swing arm lift kit for a golf cart with front drum brakes, such as Club Car® Carryall® golf carts.

Figure 7:
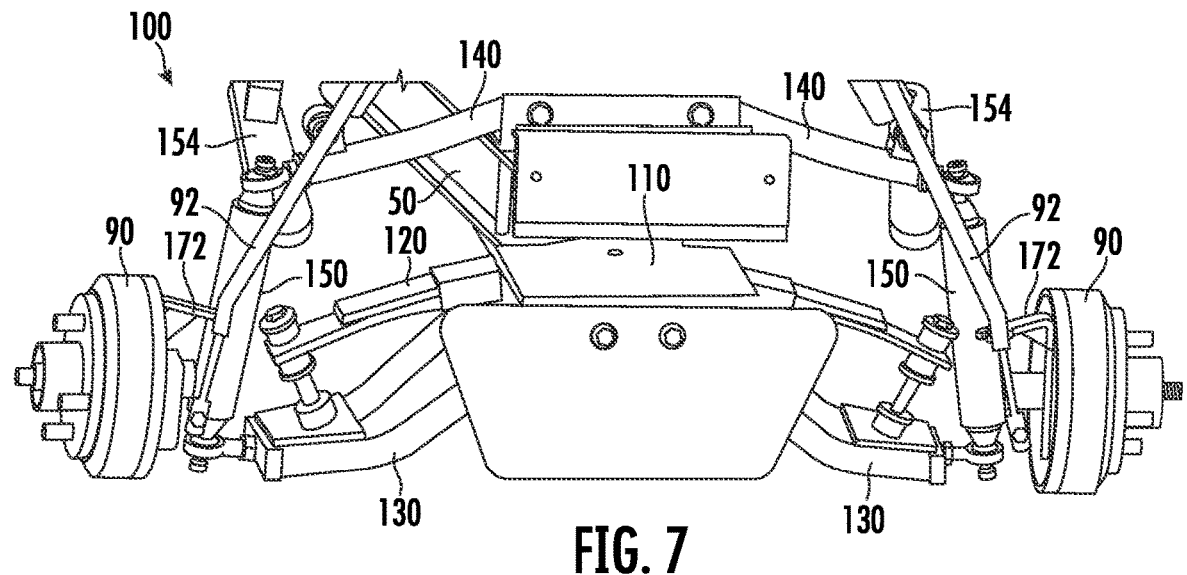

As shown in FIG. 6, spindle 150 may further include a hanger 172. Hanger 172 extends from mounting plate 158 of spindle 150. Turning to FIG. 7, hanger 172 may support a brake cable 92 of golf cart 10. For instance, hanger 172 may define a brake cable opening 174, e.g., at a distal end portion of hanger 172. As an example, mounting holes 170 may extend through mounting plate 158 along a direction that is about perpendicular to a direction that brake cable opening 174 extends through hanger 172. As shown in FIG. 7, brake cable 92 may be mountable to spindle 150 at brake cable opening 174 of hanger 172. Brake cable 92 is coupled to brake drum 90 and is operable to actuate brake drum 90. For instance, a driver of golf cart 10 may step on a brake pedal (not shown) of golf cart 10 in order to actuate brake drum 90 via brake cable 92. Cylinder 154 may be positioned between hanger 172 and steering arm 156 on spindle 150.

Figure 8:
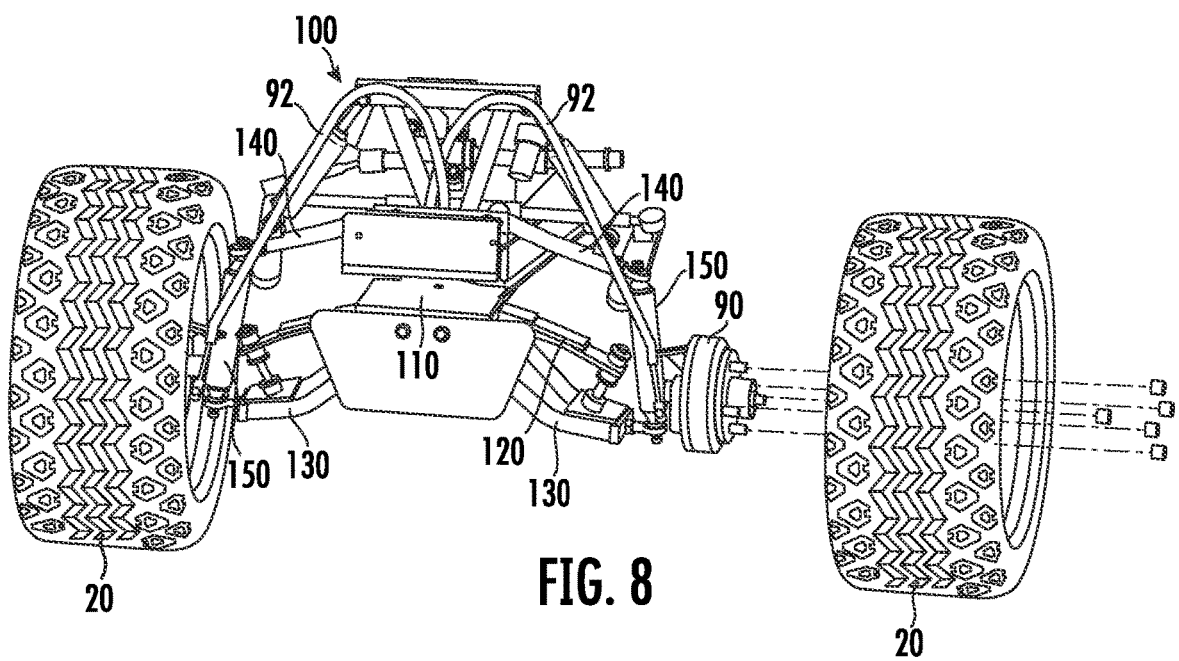

In FIG. 7, front suspension lift kit 100 may be mounted on golf cart 10 after connecting brake cable 92 to hanger 172. Moreover, as shown in FIGS. 3 through 7: support body 110 and upper swing arms 140 are mounted to frame 50; leaf spring 120 and lower swing arms 130 are mounted on support body 110, e.g., below frame 50; spindles 150 are mounted to lower and upper swing arms 130, 140; brake drum 90 of golf cart 10 are mounted to spindle 150 at mounting plate 158; and brake cables 92 are mounted to hangers 172. With front suspension lift kit 100 mounted on golf cart 10, front wheels 20 may be mounted, e.g., bolted, onto spindles 150, as shown in FIG. 8.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A front suspension lift kit for a golf cart, comprising:
   a support body mountable to a frame of the golf cart;
   a leaf spring mounted to the support body;
   a lower swing arm rotatably mounted to the support body, a distal end portion of the lower swing arm coupled to a distal end portion of the leaf spring;
   an upper swing arm rotatably mountable to the frame of the golf cart, a distal end portion of the upper swing arm mountable to a shock of the golf cart; and
   a spindle mountable to the lower and upper swing arms at the distal end portions of the lower and upper swing arms such that the spindle is rotatable on the lower and upper swing arms, the spindle comprising a mounting plate fixed on an axle of the spindle such that the mounting plate is not rotatable relative to the axle, a brake drum of the golf cart mountable to the spindle at the mounting plate.

2. The front suspension lift kit of claim 1, further comprising a pair of spindle bearings, each of the pair of spindle bearings mountable to a respective one of the lower and upper swing arms at the distal end portions of the lower and upper swing arms, the spindle mountable on the pair of spindle bearings.

3. The front suspension lift kit of claim 1, wherein the spindle further comprises a cylinder and a steering arm, the cylinder of the spindle mountable to the lower and upper swing arms at the distal end portions of the lower and upper swing arms, the steering arm extending outwardly from the cylinder of the spindle, the steering arm of the spindle configured for connecting to a tie rod.

4. The front suspension lift kit of claim 3, wherein the mounting plate of the spindle is welded to the axle of the spindle, and the steering arm is positioned above the mounting plate when the spindle is mounted to the lower and upper swing arms.

5. The front suspension lift kit of claim 1, wherein the upper swing arm comprises a mounting bracket positioned proximate the distal end portion of the upper swing arm, the shock of the golf cart mountable to the upper swing arm at the mounting bracket.

6. The front suspension lift kit of claim 1, wherein the support body comprises a support plate defining a plurality of holes, the support body mountable to the frame of the golf cart by a plurality of bolts extending through the plurality of holes.

7. The front suspension lift kit of claim 1, wherein the spindle further comprises a hanger extending from the mounting plate of the spindle, the hanger defining a brake cable opening, a brake cable of the golf cart mountable to the spindle at the brake cable opening of the hanger.

8. The front suspension lift kit of claim 1, further comprising a strut extending between the distal end portion of the lower swing arm and the distal end portion of the leaf spring.

9. The front suspension lift kit of claim 1, wherein a length of the spindle is no less than six inches and no greater than eighteen inches.

10. The front suspension lift kit of claim 1, wherein the mounting plate of the spindle is welded to the axle of the spindle.

11. The front suspension lift kit of claim 1, wherein the mounting plate defines a plurality of mounting holes, and the brake drum of the golf cart is mountable to the spindle at the mounting plate by extending a plurality of fasteners through the brake drum and the mounting plate at the plurality of mounting holes.

12. A front suspension lift kit for a golf cart, comprising:
a support body mountable to a frame of the golf cart;
a leaf spring mounted to the support body;
a lower swing arm rotatably mounted to the support body, a distal end portion of the lower swing arm coupled to a distal end portion of the leaf spring;
an upper swing arm rotatably mountable to the frame of the golf cart, a distal end portion of the upper swing arm mountable to a shock of the golf cart; and
a spindle mountable to the lower and upper swing arms at the distal end portions of the lower and upper swing arms such that the spindle is rotatable on the lower and upper swing arms, the spindle comprising a mounting plate welded to an axle of the spindle such that the mounting plate is not rotatable relative to the axle, a brake drum of the golf cart mountable to the spindle at the mounting plate, the spindle further comprises a hanger extending from the mounting plate of the spindle, the hanger defining a brake cable opening, a brake cable of the golf cart mountable to the spindle at the brake cable opening of the hanger.

13. The front suspension lift kit of claim 12, wherein the mounting plate defines a plurality of mounting holes, and the brake drum of the golf cart is mountable to the spindle at the mounting plate by extending a plurality of fasteners through the brake drum and the mounting plate at the plurality of mounting holes.

14. The front suspension lift kit of claim 12, further comprising a pair of spindle bearings, each of the pair of spindle bearings mountable to a respective one of the lower and upper swing arms at the distal end portions of the lower and upper swing arms, the spindle mountable on the pair of spindle bearings.

15. The front suspension lift kit of claim 12, wherein the spindle further comprises a cylinder and a steering arm, the cylinder of the spindle mountable to the lower and upper swing arms at the distal end portions of the lower and upper swing arms, the steering arm extending outwardly from the cylinder of the spindle, the steering arm of the spindle configured for connecting to a tie rod.

16. The front suspension lift kit of claim 15, wherein the steering arm is positioned above the mounting plate when the spindle is mounted to the lower and upper swing arms.

17. The front suspension lift kit of claim 12, wherein the upper swing arm comprises a mounting bracket positioned proximate the distal end portion of the upper swing arm, the shock of the golf cart mountable to the upper swing arm at the mounting bracket.

18. The front suspension lift kit of claim 12, wherein the support body comprises a support plate defining a plurality of holes, the support body mountable to the frame of the golf cart by a plurality of bolts extending through the plurality of holes.

19. The front suspension lift kit of claim 12, further comprising a strut extending between the distal end portion of the lower swing arm and the distal end portion of the leaf spring.

20. The front suspension lift kit of claim 12, wherein a length of the spindle is no less than six inches and no greater than eighteen inches.

* * * * *